Patented Jan. 19, 1937

2,068,124

UNITED STATES PATENT OFFICE 2,068,124

ANTHRAQUINONE DYES AND PROCESS FOR PREPARING THE SAME

Samuel Ellingworth, Norman Hulton Haddock, Frank Lodge, and Colin Henry Lumsden, Blackley, Manchester, England, assignors to Imperial Chemical Industries Limited, a corporation of Great Britain No Drawing. Application December 15, 1933, Serial No. 702,646. In Great Britain December 30, 1932

7 Claims. (Cl. 260—58)

In British Patent 406,689, we have described the manufacture of new anthraquinone dyestuffs having the general formula:

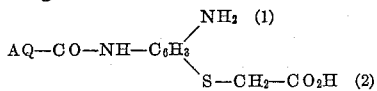

where AQ represents anthraquinone, substituted or unsubstituted, and the substituents marked (1) and (2) are ortho to each other. These dyestuffs are applied to animal fibers to give fast dyeings by a method also mentioned therein.

It has now been found that the principle involved in the application of these dyestuffs can be extended to further new products. The present invention relates to the manufacture and application of new anthraquinone dyestuffs, containing amino and thioglycollic acid groups in ortho positions to one another and having the general formula:

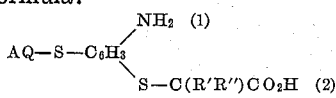

Both here and later in this specification R' and R" each stand for hydrogen, or an alkyl, aryl or aralkyl group.

The new dyestuffs are obtained by effecting interaction between a halogeno anthraquinone, or a substituted derivative thereof, and a mercapto-keto-dihydro-benz-thiazine of the following general formula:

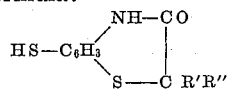

The product is then hydrolyzed by means of dilute alkali to the amino-thioglycollic acid, as illustrated by the following formulae:

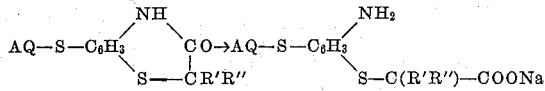

The required mercapto-keto-dihydro-benz-thiazines are obtained from the corresponding amino compounds which are converted through the diazo derivatives to the xanthate esters, which are then hydrolyzed to the mercaptans, and the products oxidized, if desired, to the corresponding disulphides from which the mercapto derivatives are again reproduced by reduction with alkali sulphides.

Alternatively, the new dyestuffs are prepared by causing a halogeno-anthraquinone, which may also bear other substituents, to react with a mercapto-aryl-thioglycollic acid of the general formula:

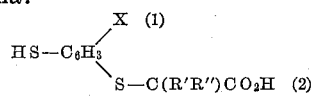

where X represents a nitro or an amino group.

When a nitro-mercapto-aryl-thioglycollic acid is used, the nitro group is subsequently reduced, yielding products identical with those obtained by the use of the amino-mercapto-aryl-thioglycollic acids. The formation of the dyestuffs is illustrated by the following formulae:

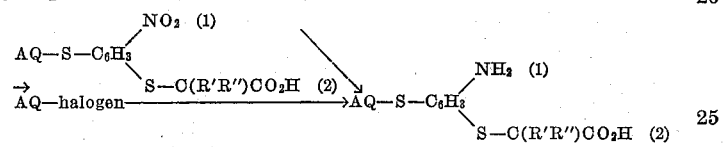

The required nitro-mercapto-aryl-thioglycollic acids are prepared via the diazo compounds from the corresponding nitro-amino-aryl-thioglycollic acids, which are obtained by the methods described in British Patent 406,281. The amino-mercapto-aryl-thioglycollic acids are obtained by reduction of the nitro derivatives, or by hydrolysis of the mercapto-keto-dihydro-benz-thiazines described above.

New dyestuffs of this type are also produced when a mercapto-anthraquinone or substituted derivative thereof is caused to react with a 2-nitro-3-halogeno-1- or a 2-nitro-5-halogeno-aryl-1-thioglycollic acid, and the nitro group is subsequently reduced.

The new dyestuffs are applied to the fiber from an acid bath, and are subsequently fixed by after-treament with dilute mineral acids, according to the process described in U. S. Patents 1,985,287 and 2,015,011. They yield bright shades of exceptional fastness to light, washing, milling and potting. They may also be used as pigments.

The invention is illustrated but not limited by the following examples, in which the parts are by weight.

*Example 1*

39.2 parts of bis-(3-keto-2,3-dihydrobenz-1,4- thiazine)-7,7'-disulphide, 200 parts of alcohol, 25 parts of sodium sulphide crystals, and 50 parts of caustic soda liquor 70° Tw. are stirred and boiled for 5 minutes on the steam bath. To the clear solution are added 31.6 parts of 1-bromo-4-methyl-amino-anthraquinone and the mixture boiled for ½ hour. The reaction product is then filtered off cold, washed with alcohol and warm water, and dried.

It is a violet powder soluble in concentrated sulphuric acid to a reddish solution and in hot pyridine to a purple solution. It is converted to the water-soluble dyestuff as follows:

30 parts of condensation product and 300 parts of caustic soda liquor 70° Tw. are mixed and stirred and boiled for 3 hours. 750 parts of cold water are added and the suspended dyestuff filtered off. The product is then heated to the boil in 2000 parts of water, filtered hot if necessary to remove insoluble matter, and the dyestuff precipitated from solution with 100 parts of salt. It is filtered cold and dried at 50° C.

It is a violet powder which dissolves readily in warm water to a clear purple solution. It is applied to the fiber as described in U. S. Patents 1,985,287 and 2,015,011. Wool is dyed in bright purple shades of outstanding fastness to washing, milling, and potting.

Example 2

80 parts of bis-(3-keto-2,3-dihydrobenz-1,4-thiazine)-7,7'-disulphide, 200 parts of alcohol, and 50 parts of sodium sulphide crystals are stirred and boiled for 5 minutes on the steam bath. To the clear solution are added 200 parts of pyridine and 42.4 parts of 1,5-dibromo-4,8-dimethyl-diamino-anthraquinone and the mixture boiled for 15 mintues with good stirring. The product separates as a blue suspension. It is filtered hot, washed with alcohol and hot water, and dried at 50–100° C.

It is a bright blue powder, soluble in concentrated sulphuric acid to an orange solution and in hot pyridine to a blue solution. It is insoluble in water and dilute alkalies, and is converted to the water-soluble dyestuff as follows:

50 parts of condensation product and 500 parts of caustic soda liquor 70° Tw. are mixed and stirred and boiled for 3 hours. 1500 parts of cold water are added and the product filtered off. It is heated to the boil in water, filtered to remove traces of insoluble matter, and the blue solution obtained treated with salt to precipitate the dyestuff. The liquor is filtered cold, the dyestuff washed with weak brine, and dried at 50° C.

The dyestuff is a blue powder which dissolves readily in warm water to a clear, bright blue solution. It is applied to wool as in the case of Example 1, bright blue shades being obtained of outstanding fastness to washing, milling, and potting.

Example 3

25 parts of 6-mercapto-3-keto-2-ethyl-2,3-dihydrobenz-1,4-thiazine, 27 parts of 2-chloroquinizarine, 14 parts of caustic soda liquor (70° Tw.), and 200 parts of pyridine are boiled, under a reflux condenser for 1 hour. The mixture is cooled, diluted with methylated spirits, filtered and the material on the filter dried. The dry product, which is reddish orange and crystalline is intimately mixed with 300 parts of caustic soda liquor (70° Tw.). The mixture is boiled and stirred for 2 hours and then diluted with 500 parts of ice; acetic acid is slowly added until the mixture is faintly alkaline to brilliant yellow. The precipitated dyestuff is filtered off, and washed with a 10% brine solution. It is purified by dissolving in hot water, filtering from insoluble matter, and re-precipitating by addition of salt. The dark red powder so obtained dissolves readily in warm water with a bluish red colour. The dyestuff when applied to the fibre as in Example 1, gives a dull red shade, changing on treatment with hot dilute mineral acid to a bright reddish-orange of outstanding fastness to washing and potting.

The 6-mercapto-3-keto-2-ethyl-2,3-dihydrobenz-1,4-thiazine used in the above preparation is obtained as follows:—

2,4-dinitrophenylmercaptan (Willgerodt, Ber., de deutsche Chem. Gesell. 17, 352) is condensed in alkaline solution with α-bromobutyric acid, and the resulting 2,4-dinitrophenyl-α-ethylthioglycollic acid is reduced with iron and hydrochloric acid. 6-amino-3-keto-2-ethyl-2,3-dihydrobenz-1,4-thiazine (M. P. 140–1°) is thus obtained, and is converted to the corresponding mercapto derivative by known methods through the diazo compound and the xanthate ester.

Example 4

By substituting for the 6-mercapto-3-keto-2-ethyl-2,3-dihydrobenz-1,4-thiazine of Example 3, an equal quantity of the corresponding 7-mercapto derivative, and carrying out the same procedure, a dyestuff is obtained, which applied to wool and treated with mineral acid as described in Example 1, gives a shade redder than that of the product of Example 3.

In order to obtain the 7-mercapto-3-keto-2-ethyl-2,3-dihydrobenz-1,4-thiazine, 2,5-diaminophenylmercaptan (U. S. Patent 2,015,011) is reacted in alkaline solution with α-bromobutyric acid, and the product converted to the 7-aminothiazine (M. P. 141–3°) by heating with dilute mineral acid. The corresponding mercapto derivative is then obtained from the amino compound by known methods, through the diazo compound and xanthate ester.

Example 5

54 parts of 6-mercapto-3-keto-2-ethyl-2,3-dihydrobenz-1,4-thiazine, 30 parts of 2,3-dichloro-1,4-diaminoanthraquinone, 32 parts of caustic soda liquor (70° Tw.), and 200 parts of pyridine are stirred and boiled under a reflux condenser for 16 hours. The mixture is cooled and filtered and the filtered solid material washed with alcohol and dried. The dry product is a dull blue powder. It is intimately mixed with 300 parts of caustic soda liquor (70° Tw.) and the suspension boiled for 2 hours under a reflux condenser. An equal volume of water is now added and the suspended dyestuff is filtered off and washed with dilute brine until all the violet coloured impurity is removed. The residue is redissolved in boiling water, boiled several minutes with charcoal, and filtered hot. Salt is added to the filtrate and the precipitated dyestuff is filtered, washed with dilute brine and dried. It is a blue powder soluble in hot water with a blue colour. When applied by the method as in Example 1, wool is dyed in blue shades, which after treatment with hot dilute mineral acid are fast to washing, milling, potting and light.

Example 6

27 parts of 6-mercapto-3-keto-2-ethyl-2,3-dihydrobenz-1,4-thiazine, 24 parts of α-chloroanthraquinone, 18 parts of caustic soda (70° Tw.) and 200 parts of pyridine are stirred and boiled under reflux for 1 hour. The mixture is diluted with alcohol and filtered, the residue is washed with alcohol and dried. The dry orange product is mixed with 300 parts of caustic soda liquor (70° Tw.) and the mixture boiled for 1½ hours. 300 parts of water are added and the suspended dyestuff is filtered and washed with a 10% solution of brine. For purification it is dissolved in hot water, filtered from a little insoluble matter and reprecipitated with salt, filtered and dried. The dry dyestuff is a yellowish-orange powder soluble in warm water. Wool is dyed in orange yellow shades, which after lactamization with hot dilute mineral acid are fast to washing, potting and milling.

Example 7

By substituting for the 6-mercaptothiazine of Example 6, an equal weight of the corresponding 7-mercapto derivative, a dyestuff is obtained which on application to wool and lactamization with dilute mineral acid gives a greener shade of yellow than that of the product described in Example 6.

Example 8

A solution of 10 parts of 1-amino-5-mercaptoanthraquinone in 2 parts of caustic soda and 250 parts of water is added to 10 parts of 5-chloro-2-nitrophenylthioglycollic acid (prepared by the condensation of 4-nitro-3-chloroaniline and thioglycollic acid, subsequent diazotization of the so-obtained 2-nitro-5-aminophenylthioglycollic acid, and treatment of the diazo compound with cuprous chloride), 5 parts of soda ash and 200 parts of water. The mixture is stirred and boiled for 5 minutes. There is an immediate precipitation of the condensation product. This is filtered and washed with a little water. The so-obtained product is mixed with 300 parts of methylated spirits and 30 parts of sodium sulphide crystals and the mixture refluxed for 10 minutes. The alcohol is removed by evaporation and the residue dissolved in the minimum quantity of water. The solution is filtered, and the filtrate treated with salt to precipitate the dyestuff. The dyestuff is filtered and washed with 10% brine. It is a brown powder, soluble in water with an orange color. When applied to wool as in the foregoing examples, bright reddish-orange shades are obtained which change to a somewhat yellower shade on treatment with hot dilute mineral acid. The dyeing is fast to washing, potting, and milling.

Example 9

31.6 parts of 1-bromo-methylaminoanthraquinone, 28 parts of 2-nitro-4-mercaptophenylthioglycollic acid, 13 parts of sodium carbonate and 250 parts of pyridine are heated to the boil, with stirring. 15 parts of 32% caustic soda solution are added and the mixture boiled gently at 110–115° C. for half an hour. The violet product which separates is filtered off and washed with alcohol. After treatment with hot dilute mineral acid the product is again filtered, washed well with cold water and dried.

29 parts of the so-obtained condensation product are dissolved in a mixture of 1500 parts of water and 60 parts of aqueous 32% caustic soda. 150 parts of sodium sulphide crystals are added to this solution and reduction effected by heating at 70–75° C. for half an hour. 250 parts of salt are added and the dyestuff which precipitates filtered off cold. It is then dissolved in the solution, filtered from traces of suspended matter, the dyestuff is again precipitated with salt, filtered and dried.

The dyestuff dissolves readily in warm water with a violet color. It dyes wool direct in violet shades which become redder on lactamization with hot dilute acid. The lactamized shade shows exceptional fastness to washing, milling and plotting.

Example 10

By substituting for the 6-mercapto-3-keto-2-ethyl-2,3-dihydrobenz-1,4-thiazine of Example 5, the equivalent quantity of 6-mercapto-3-keto-2,3-dihydrobenz-1,4-thiazine and working according to the same procedure, a dyestuff is obtained which when applied to the fibre and lactamized as in the foregoing examples gives a similar shade to that of Example 5 and is similarly fast to light, washing, milling and potting.

Example 11

By substituting for the 6-mercapto-3-keto-2-ethyl-2,3-dihydrobenz-1,4-thiazine of Example 3, an equivalent quantity of 6-mercapto-3-keto-2,3-dihydrobenz-1,4-thiazine, and working according to the same procedure, a dyestuff is obtained which when applied to the fibre and lactamized as in the foregoing examples, gives a bright red shade, bluer than that of Example 3 and of outstanding fastness to washing and potting.

By the expression "auxochrome group" as used in the specification and claims is meant any group that intensifies the color of the dyestuff or enhances the color of the compound toward the violet.

What we claim is:

1. The lactams, free acids and alkali-metal salts of the compounds which when existing in the form of the free acids have the following formula:

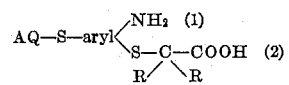

wherein AQ stands for an anthraquinone radical and the R's stand for one of the group hydrogen, alkyl, aryl and aralkyl.

2. The lactams, free acids and alkali-metal salts of the acids which when existing as the free acids have the following formula:

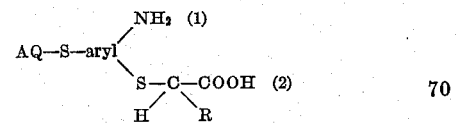

wherein AQ stands for an anthraquinone radical and R stands for an alkyl group.

3. The lactams, free acids and alkali-metal salts of the acids which when existing as the free acids have the following formula:

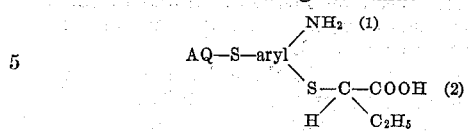

wherein AQ stands for an anthraquinone radical.

4. Compounds having the following general formula:

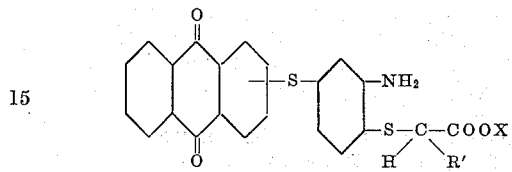

wherein the anthraquinone nucleus contains at least one auxochrome group, X stands for one of the group hydrogen and alkali-metals, and R' stands for one of the group H and —$C_2H_5$.

5. Compounds of the formula:

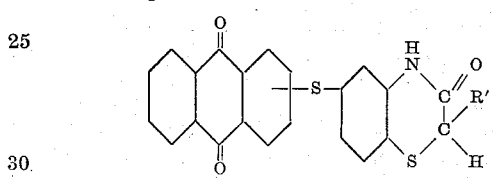

wherein the anthraquinone nucleus contains at least one auxochrome group, and R' stands for one of the group H and —$C_2H_5$.

6. In the process for preparing dyestuffs, the step which comprises reacting a compound of the formula AQ-Z with a compound of the formula:

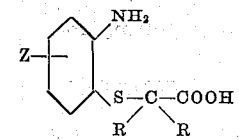

its alkali-metal salt or lactam wherein one Z of the two formulas stands for a halogen atom and the other Z stands for the radical HS-, and in which the R's represent one of the group hydrogen, aryl, alkyl and aralkyl radicals, and AQ represents an anthraquinone radical.

7. In the process for preparing new dyestuffs, the step which comprises reacting a halogenoanthraquinone compound with a mercapto-ketodihydrobenz-thiazine of the formula:

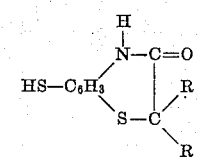

wherein the R's represent one of the group hydrogen, aryl, alkyl and aralkyl, and hydrolyzing the product obtained by means of alkalies.

SAMUEL ELLINGWORTH.
NORMAN HULTON HADDOCK.
FRANK LODGE.
COLIN HENRY LUMSDEN.